United States Patent [19]

Jacobson et al.

[11] 3,751,083

[45] Aug. 7, 1973

[54] TENSION TURNBUCKLE

[75] Inventors: Sol H. Jacobson, Bedford; Donald R. Gorsuch, Northborough, both of Mass.

[73] Assignee: Sanders Associates, Inc., Nashua, N.H.

[22] Filed: Feb. 25, 1972

[21] Appl. No.: 229,450

[52] U.S. Cl. .................................. 287/60, 254/67
[51] Int. Cl. ............................................ F16b 7/06
[58] Field of Search .................. 287/60, 61, 59, 62; 254/67, 54, 43; 29/175 R; 114/109

[56] References Cited
UNITED STATES PATENTS
2,227,609   1/1941   Troman ............................... 287/59
346,771   8/1886   Phillips .............................. 287/60 X
716,633   12/1902   Hains et al. ........................ 287/60 X
1,157,721   10/1915   Price ................................. 287/61 X Primary Examiner—Andrew V. Kundrat
Attorney—Louis Etlinger

[57] ABSTRACT

A tension turnbuckle comprises first and second bolts having connectors integral therewith, a preloaded spring arranged about the inner end of said second bolt, a turnbuckle housing threaded onto said first bolt for movement thereon and fixed to the outer end of said preloaded spring, an indicator fixed to the inner end of said second bolt and cooperating with a viewing slot within the turnbuckle housing to permit ascertation of the tension of the turnbuckle, and a housing cap arranged to be screwed onto the turnbuckle housing after the proper tension is achieved to lock out the spring and provide a solid metal load path through the turnbuckle from the first bolt to the second bolt.

9 Claims, 3 Drawing Figures

PATENTED AUG 7 1973 3,751,083

TENSION TURNBUCKLE

The invention herein described was made in the course of or under a contract or subcontract thereunder with the Department of the Army.

BACKGROUND OF THE INVENTION

A turnbuckle is a device for tightening a rod, a cable or a stay, and has many applications such as for attaching pay loads to various ground vehicles, aircrafts and ships, as well as in rigging systems for towers or other devices that are restrained by cables. One problem with conventional turnbuckles is that there is no indication provided whereby the user can apply a predetermined load into a cable or similar tension device. Normally, strain gauges or other measuring devices are necessitated which are unduly complex and lack any self reading feature.

Furthermore, certain turnbuckles are provided with preloaded springs thereon so as to limit the amount of force that has to be applied by the user. When a preloaded spring is a part of the turnbuckle the spring itself becomes a part of the spring system in addition to, for example, the cable on which the turnbuckle is used. In cable systems, as well as other systems wherein a turnbuckle is employed, it is desirable normally to have the highest spring rate possible for the system in order to prevent resonances when the cable is in tension. Unfortunately, the preloaded spring in the turnbuckle generally will have a spring rate orders of magnitude lower than the cable itself has in tension, and since the overall spring rate for springs in series is somewhat less than the lowest spring rate of any spring in the system, which in the case of the spring loaded turnbuckle would be the preloaded spring itself, the cable system would have a low spring rate.

SUMMARY OF THE INVENTION

Accordingly, it is an object of this invention to provide an improved turnbuckle assembly.

It is another object of this invention to provide a turnbuckle assembly having an indicator integral therewith for indicating the tension applied thereto.

It is a further object of this invention to provide a spring loaded turnbuckle having means for locking out the spring after the proper tension has been applied thereto.

Briefly, a turnbuckle is provided having a first bolt on one end thereof on which is screwed a first end of a turnbuckle housing. A second bolt at the other end of the turnbuckle has a preloaded spring arranged about the inner circumference thereof with the other end of the turnbuckle housing and the bolt assembly together containing the spring. A housing cap is provided to rotate freely about the second bolt, and is threaded internally to permit threading the housing cap about the end of the housing near the spring. An indicator system is also provided for indicating the the amount of tension supplied by the turnbuckle. After the turnbuckle is set to the desired tension, the housing cap is screwed onto the housing assembly to lock out the preloaded spring precluding any resonances to be caused thereby.

BRIEF DESCRIPTION OF THE DRAWINGS

The above-mentioned and other features and objects of this invention will become more apparent by reference to the following description, taken in conjunction with the accompanying drawings, in which.

DESCRIPTION OF PREFERRED EMBODIMENTS

Figure 1:
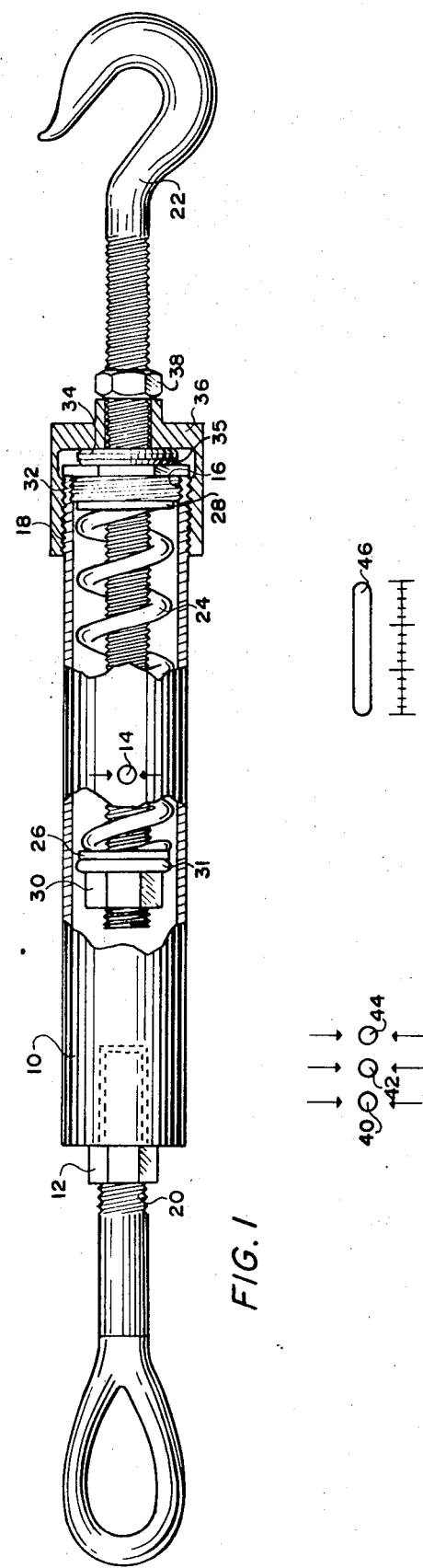
FIG. 1 is a partial cross-sectional and broken view of a turnbuckle in accordance with the present invention.

Referring now to FIG. 1, there is therein illustrated a preferred embodiment of the invention comprising a turnbuckle housing 10 having an end cap 12 affixed thereto allowing for rotation of said housing with a wrench. Housing 10 has a hole 14 therein for viewing an indicator, as will be described hereinafter. Housing 10 also has internal threads 16 and external threads 18 at the right hand end thereof. End cap 12 of housing 10 has internal threads therein and in use is screwed about an eye bolt 20. Although an eye bolt is illustrated in this embodiment, any connecting means can be employed. For example, the hook bolt shown at the other end of the device could replace the eye bolt, as could any other connecting means for coupling the turnbuckle to the system in which tension is to be applied.

The second connector for the turnbuckle assembly is provided by a hook bolt 22. A spring 24 is arranged about bolt 22 and is preloaded between a pair of thrust bearings 26 and 28. Spring 24 is maintained in a fixed position about bolt 22 by a nut 30 having an indicator portion 31 and a stop nut 34 threaded on bolt 22 and working against a locking nut 32 not connected to bolt 22. In this embodiment of the invention spring 24 is a helical compression spring which is preloaded in excess of 1,000 pounds. Nut 32 has external threads which mate with the threads 16 of housing 10. A housing cap 36 is arranged about bolt 22 for free rotation, and a plain nut 38 is threaded about bolt 22.

The purpose of the turnbuckle assembly is to produce a load between two objects. Eye bolt 20 is attached to one object and hook bolt 22 is attached to the other object. It is required to bring the two objects together with a known force and then retain this force with the equivalent of a solid bar.

Initially the subassembly comprising the preloaded spring 24 and its retaining members 26, 30, 28, 32, 34, the housing cap 36, and plain nut 38 are assembled. The threads of bolt 22 outside nut 30 and on both sides of nut 34 are upset during the assembly. The subassembly is inserted into the housing 10. The housing 10 is then screwed onto the locking nut 32 with sufficient force such that it will be affixed thereto with no movement occurring therebetween during tightening of the turnbuckle. The two bolts 20, 22 are then attached to the objects to be loaded. In operation the housing cap 36 and plain nut 38 are moved to the right away from the housing 10 by threading the plain nut 38 up the bolt 22. The turnbuckle housing is then turned in a manner so that it tends to thread onto the bolt 20 until the indicator 31 appears in the hole 14 and lines up with the arrows associated therewith. Preferably, indicator 31 is painted white to aid in the alignment. The desired load has now been achieved since the position of the hole in housing 10 has been predetermined. A space will now exist between locking nut 32 and stop nut 34 at 35. The load path is now from bolt 20 to housing 10 through spring 24 to bolt 22.

Since the spring 24 can present undesired spring rates to the system in which it is attached, the spring is taken out of the system by screwing the housing cap 36 onto the external threads of the housing 10 until it bottoms against the stop nut 34. Plain nut 38 is then jammed against the housing cap, thus providing a solid metal load path from the hook bolt 22 to the eye bolt 20. To unload the tension on the turnbuckle, the above procedure is reversed.

Figure 3:
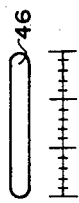
FIG. 3 is another indicating system for the turnbuckle of FIG. 1.
Figure 2:
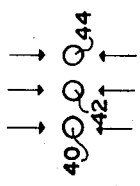
FIG. 2 is an alternate indicating device to be used in conjunction with the turnbuckle of FIG. 1.

The device of FIG. 1 is used wherein only a single load is to be achieved. If other single loads are to be achieved, the hole 14 can be positioned elsewhere along the housing. If the turnbuckle is to be employed for various loading applications, then the hole of FIG. 1 would be replaced either by the holes 40, 42, 44 of FIG. 2 or the slot 46 of FIG. 3. In the embodiment of FIG. 2, multiple holes are employed for different loads, and in the embodiment of FIG. 3 a slot with gradiations along same are employed for multiple loads.

While we have described above the principals of our invention, in accordance with specific apparatus, it is to be clearly understood that the description is made only by way of example, and not as a limitation of the scope of our invention as set forth in the accompanying claims.

We claim:
1. A tension turnbuckle, comprising:
   first and second connection means;
   a preloaded spring arranged about said second connection means; and coupled to one end thereof;
   means for coupling said first and second connection means through said preloaded spring; and
   adjustable means for providing a solid coupling between said first and second connection means and capable of locking out said preloaded spring from the load path while simultaneously maintaining it under any one of various degrees of preload.

2. A tension turnbuckle as defined in claim 1, wherein said first and second connection means comprise first and second bolts with said preloaded spring arranged about the inner end of said second bolt.

3. A tension turnbuckle as defined in claim 2, further including first and second nuts threaded onto said second bolt, one nut arranged at either end of said spring and a locking nut arranged intermediate said second nut and said spring, said locking nut being externally threaded and not connected to said second bolt.

4. A tension turnbuckle as defined in claim 3, further including first and second thrust bearings, said first and second thrust bearings arranged intermediate said spring and said first nut and locking nut, respectively.

5. A tension turnbuckle as defined in claim 3, wherein said means for coupling said first and second bolts through said spring includes a housing coupled to said first bolt and to said locking nut, said housing being externally threaded at one end thereof.

6. A tension turnbuckle as defined in claim 5, wherein said solid coupling means includes a housing cap threaded onto said housing and a nut intermediate the end of said second bolt and said housing cap.

7. A tension turnbuckle as defined in claim 5, further including indicating means arranged on said first nut, said housing having at least one hole therein to view the position of said indicating means.

8. A tension turnbuckle as defined in claim 7, wherein said housing has a number of holes therein corresponding to a plurality of predetermined tensions.

9. A tension turnbuckle as defined in claim 7, wherein said hole is elongated and has graduation markings associated therewith.

* * * * *